United States Patent [19]

Ellis

[11] Patent Number: 4,478,115

[45] Date of Patent: Oct. 23, 1984

[54] TAMPER-RESISTANT FASTENER KEY

[75] Inventor: Thomas J. Ellis, Springfield, Pa.

[73] Assignee: Southco, Inc., Concordville, Pa.

[21] Appl. No.: 571,695

[22] Filed: Jan. 18, 1984

[51] Int. Cl.³ .............................................. B25B 15/00
[52] U.S. Cl. ......................................... 81/436; 81/461
[58] Field of Search .................................. 81/436, 461

[56] References Cited

U.S. PATENT DOCUMENTS 4,025,140  5/1977  Matys ................................... 81/461
4,258,596  3/1981  Bisbing et al. ......................... 81/436

Primary Examiner—Frederick R. Schmidt
Assistant Examiner—J. T. Zatarga
Attorney, Agent, or Firm—Paul & Paul

[57] ABSTRACT

A key for a tamper-resistant fastener having three sockets, one below the other, one of the sockets being eccentric relative to the center axis of the fastener. The key comprises a flat blade portion having integral upper, middle and lower insertable portions, the center axis of the middle insertable portion being off-set from the center axis of the key. The width and length of each of the insertable portions corresponds respectively to the diameter and depth of the upper, middle, and lower sockets. The upper and lower insertable portions of the key prevent tilting of the key when torque is applied by the off-centered middle section to the eccentric middle socket of the fastener.

3 Claims, 5 Drawing Figures

TAMPER-RESISTANT FASTENER KEY

CROSS-REFERENCE TO PRIOR PATENT

This invention relates to an improvement in the drive tool for applying torque to the type of tamper-resistant fastener described and claimed in U.S. Pat. No. 4,258,596, granted Mar. 31, 1981, to Robert H. Bisbing and William R. Frame and assigned to Southco, Inc., Concordville, Pa. The assignee of Pat. No. 4,258,596, namely, Southco, Inc., is also the assignee of the present application.

BACKGROUND OF THE INVENTION

The invention relates to tamper-resistant fasteners and in particular to a tamper-resistant fastener of the type described and claimed in the U.S. Pat. No. 4,258,596.

The fastener described and claimed in the aforesaid patent has a shank portion and a head portion having three sockets in vertical arrangement, one below the other. Each socket is of circular shape. The upper and lower sockets are concentric with the shank. The middle socket is eccentric. The sockets have progressively smaller diameters, the smallest being the lowermost.

The outer sidewall of the fastener head is preferably sloped to make it more difficult for an unauthorized person to apply torque to the fastener to remove it. The head of the fastener is attached to a conventional shank which may be threaded and used in a normal manner.

In U.S. Pat. No. 4,258,596, a special cylindrical drive tool is described and claimed for applying torque to the tamper-resistant fastener. The tool shown in FIG. 3 of the said patent resembles a screw driver in general appearance but, unlike a screw driver, the shank of the tool has a cross-section which is made to correspond to that of the upper socket of the fastener, and the end of the shank has two projections in series. The first projection corresponds in cross-section and position to the middle socket in the fastener. Thus, this projection is eccentric. The second projection corresponds in cross-section and position to the lower socket. Thus, this projection is concentric.

The cylindrical tool mates firmly with the fastener head and, when torque is applied to the handle of the tool, the eccentricity of the first projection causes the projection to engage the wall of the middle socket and to apply torque thereto to turn the fastener. The upper and lower concentric sockets substantially eliminates the tendency of the driving tool to tilt when torque is applied.

While the foregoing is a brief description and summarizes that which is contained U.S. Pat. No. 4,258,596, the entire specification of U.S. Pat. No. 4,258,596 is incorporated into the present application by reference.

SUMMARY OF THE INVENTION

A principal object of the present invention is to provide an improved drive tool for applying torque to a three-socket tamper-resistant fastener of the type shown in U.S. Pat. No. 4,258,596.

A more specific object is to provide a drive tool as described above which is less expensive to produce than is the drive tool shown in U.S. Pat. No. 4,258,596.

The foregoing and other objects and advantages of the present invention are achieved by providing a drive tool which may be stamped out of a flat sheet of metal and which looks more like a key than a screw driver.

DETAILED DESCRIPTION OF THE PREFERRED EMBODIMENTS

Figure 1:
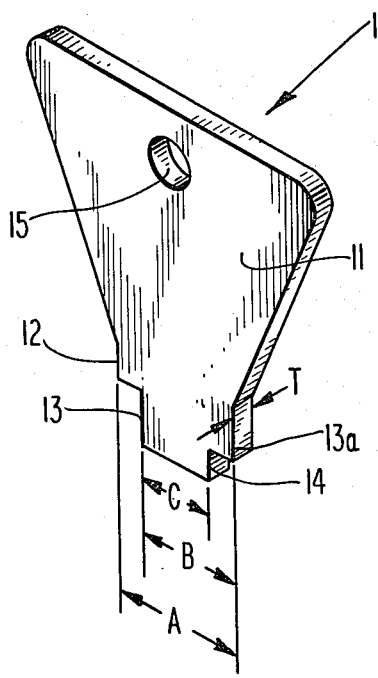
FIG. 1 is a perspective view of the key type of drive tool, according to the present application.
Figure 2:
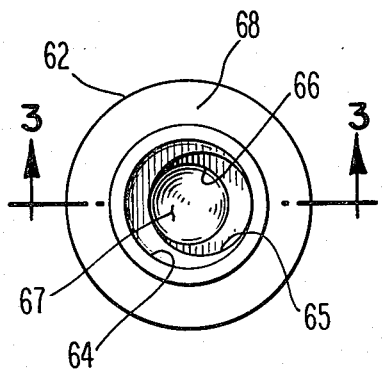
FIG. 2 is a plan view of the tamper-resistant fastener. This FIG. 2 corresponds to FIG. 1 of U.S. Pat. No. 4,258,596.

FIG. 1 is a perspective view of a key 10, according to the present invention. As there shown, key 10 is a flat blade having a thickness T and having at one end a head 11 which tapers toward an insertion portion having widths identified A, B and C. These widths correspond respectively to the diameters I, H and G of the three sockets 64, 65 and 66, as shown in FIG. 3.

Figure 3:
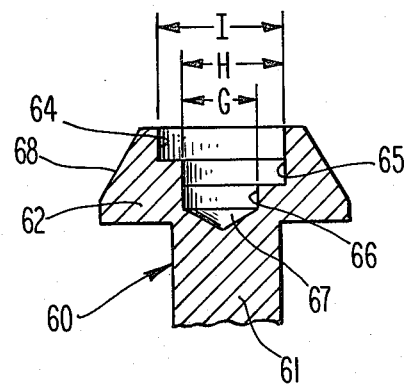
FIG. 3 is a cross-section through the fastener looking along the lines 3—3 of FIG. 2. This FIG. 3 corresponds to FIG. 2 of U.S. Pat. No. 4,258,596.

The insertion portion of the key has a configuration that would be obtained by taking a longitudinal center cross-section of the cylindrical tool shown in FIG. 3 of U.S. Pat. No. 4,258,596. Specifically, the upper insertion portion of the key corresponds to the center cross-section of the cylindrical shank 12 of the tool of U.S. Pat. No. 4,258,596; the intermediate insertion portion of the key corresponds to the center cross-section of the circular disc portion 13 of the cylindrical tool of the patent; and the lower insertion portion of the key corresponds to the center cross-section of the circular disc portion 14 of the tool of the patent.

In the present application, the lengths of the upper, intermediate and lower insertion portions of the key correspond to the depths of the three sockets of the fastener, and as already indicated, widths A, B and C of the key are roughly equal to the socket diameters labeled I, H and G in FIG. 3. The words "roughly equal" are used because actually the width dimensions of the insertion portions of the key are somewhat smaller than the diameters of the sockets of the fastener to allow for the thickness of the stamped part. This is visible in FIG. 5. Actually, the dimension from the corner on one face of one of the insertion portions of the key to the corner on the opposite face corresponds exactly with the diameter of the corresponding socket and of the corresponding cylindrical part of the tool of U.S. Pat. No. 4,258,596. Where the letter T designates the thickness of the stamp, then the square root of the sum of the squares of the dimensions A and T on the key corresponds with diameter A of the cylindrical part shown in FIG. 4 of the patent. The same applies to dimensions B and T; and to dimensions C and T.

The key 10 shown in the present application is considerably less expensive to manufacture than is the cylindrical tool shown in FIG. 3 of U.S. Pat. No. 4,258,596. The key is less expensive because it is manufactured by a high speed stamping process, as opposed to the much slower turning process used to produce the cylindrical tool of the patent. The key also provides improved quality because the critical dimensions, being produced by a fixed stamping tooling, are not subject to the variations associated with a turning process. In a turning process, variations can occur during a production run due to tool wear. Variations can also occur from run to run due to operator set-up.

The shape 11 of the wider portion of key 10 is purely arbitrary. Various other shapes may, of course, be employed. The hole 15 enables the key to be attached to a key ring.

FIG. 3, which has already been referred to, is a fragmentary cross-section of the tamper-resistant fastener 60 which is shown to comprise a shank 61 and a head portion 62. The shank 61 may be threaded, according to the needs of the user. As already indicated, the head 62 carries the three sockets, the upper socket 64 having a diameter I, the intermediate 65 having a diameter H, and the lower socket 66 having a diameter G. Diameter I is the largest of the three diameters. The lower socket 66 may include an additional downward sloping extension 67. The intermediate socket 65 is eccentric relative to the shank 61 and also relative to the upper socket 64 and the lower socket 66. The upper and lower sockets 64 and 66 are concentric relative to the shank 61.

Figure 4:
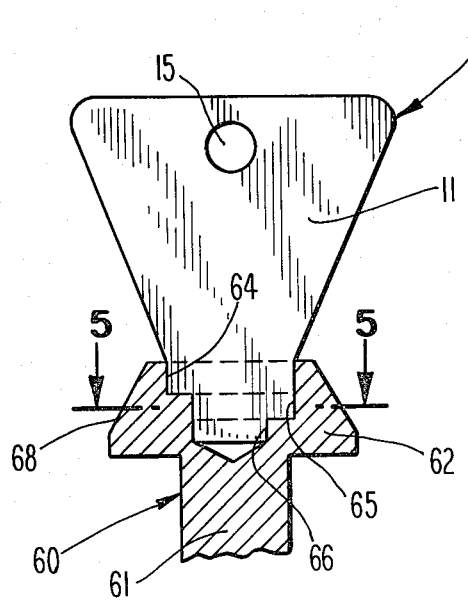
FIG. 4 is a cross-section through the fastener showing the key in place.

FIG. 4 illustrates the flat key 10 inserted into the fastener 60. It will be seen that the upper portion of the insertion corresponds in width and length to the diameter and depth of the concentric upper socket 64; that the middle portion of the insertion corresponds in width, length and position to the diameter, depth and position of the eccentric intermediate socket 65; and that the lower portion of the insertion corresponds in width and length to the diameter and depth of the concentric lower socket 66.

Figure 5:
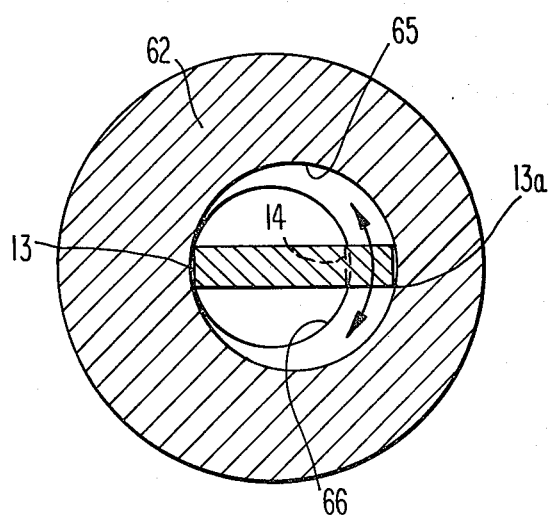
FIG. 5 is a cross-section looking along the line 5—5 of FIG. 4.

Referring now to FIG. 5, which is a cross sectional view looking down along the line 5—5 of FIG. 4, it will be seen that when the key 10 is rotated, say in the clockwise direction, the corner edge, identified 13(a) in FIG. 5 will come into contact with the wall of the eccentric intermediate socket 65 and will apply torque thereto in the clockwise direction. This will cause the fastener to rotate about its center axis which is at the center of the uppermost and lowermost sockets 64 and 66. Since the lowermost and uppermost portions 12 and 14 of the inserted portion of the key rotate about the center axis of the fastener, these inserted portions of the key do not apply torque to the sidewalls of the sockets in which they are located. However, these two inserted portions of the key, i.e. the lower portion 14 and the upper portion 12, stabilize the key in that they force the key to rotate on its own axis and on the axis of the shank of the fastener, thereby preventing the key from tilting when its intermediate eccentric section 13 applies torque to the fastener.

It will be seen from FIG. 5 that key 10 may be turned in the counterclockwise direction, as well as in the clockwise direction, with similar results.

It will also be seen from the drawings that the stamped key can be inserted into the fastener in only one rotationally oriented position. Thus, the key must be capable of transmitting torque to the fastener.

What is claimed is:

1. A key for applying torque to a tamper-resistant fastener, said fastener having a shank and a head, said head having three sockets of circular cross section, namely, an upper socket, a lower socket, and an intermediate socket, said sockets having progressively smaller diameters, the lower socket having the smallest diameter, said upper and lower sockets each being concentric with said shank, said intermediate socket being eccentric with said shank, said key comprising:
   a. a flat insertable portion having an integrally connected upper portion, intermediate portion and lower portion;
   b. said upper and lower insertable portions of said key having respectively the largest and smallest widths, said widths corresponding to the diameters of the upper and lower sockets of said fasteners;
   c. said upper and lower insertable portions of said key having a common center axis;
   d. said intermediate insertable portion of said key having a width corresponding to the diameter of said intermediate socket;
   e. said intermediate insertable portion having a center axis which is off-set from the axis of said upper and lower insertable portions.

2. A key according to claim 1 wherein a handle portion is provided integral with said insertable key portion, said handle having a width greater than that of said key portion.

3. In combination: A. a tamper-resistant torque-responsive fastener comprising a shank and a head;
   a. said head having a peripheral sidewall adapted to prevent the application of torque to said head which will be effective on the shank;
   b. said head having first, second and third sockets each having a circular cross section, said sockets having, respectively, first, second and third diameters, each different from the other;
   c. said first diameter being larger than said second diameter, said second diameter being larger than said third diameter;
   d. said second socket extending below the bottom of said first socket, said third socket extending below the bottom of said second socket;
   e. said first and third sockets each being concentric relative to the shank of said fastener;
   f. said second socket being eccentric relative to the said fastener shank; and B. a key for applying torque to said tamper-resistant torque-responsive fastener, said key comprising:
   a. a handle;
   b. a first flat insertable projection extending from said handle and having a width corresponding to said first socket diameter;
   c. a second flat insertable projection extending from said first projection, said second projection having a width less than that of said first projection;
   d. a third flat insertable projection extending from said second projection, said third projection having a width less than that of said second projection;
   e. the center axis of said second projection being off-set relative to the center axis of said first and third projections;
   f. said first, second and third insertable projections having such widths and lengths as to be insertable into matable engagement respectively with said first, second and third sockets of said fastener;
   g. the center axis of said first and third insertable projections being coincident with the axis of said fastener shank when said key is inserted into said fastener.

* * * * *